June 30, 1942.  F. C. STANLEY  2,287,914

BRAKE LINING DRILLING SUPPORT

Filed Nov. 13, 1940  2 Sheets-Sheet 1

Inventor:
Frederick C. Stanley
By Lee J. Gary
Attorney

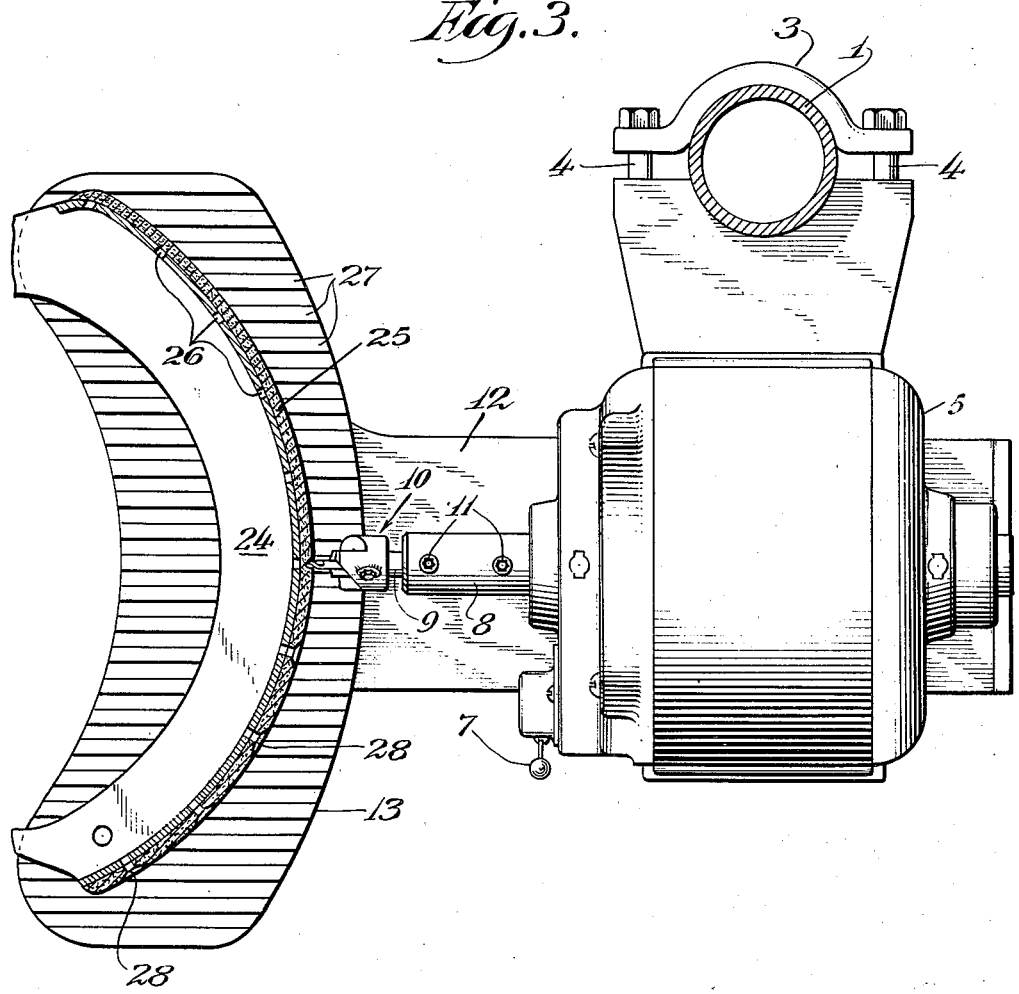

Patented June 30, 1942

2,287,914

UNITED STATES PATENT OFFICE 2,287,914

BRAKE LINING DRILLING SUPPORT

Frederick C. Stanley, Bridgeport, Conn., assignor to Raybestos-Manhattan, Inc., Passaic, N. J., a corporation of New Jersey Application November 13, 1940, Serial No. 365,449

1 Claim. (Cl. 77—63)

This invention relates to improvements in a device for drilling brake linings after the same have been mounted upon a brake shoe, the device being characterized in that its construction is simple and economical, and in that it can be quickly adjusted to drill the linings rapidly, accurately and conveniently.

It has heretofore been the practice in mounting brake linings upon brake shoes for automotive use, to first drill the brake shoe at predetermined points to provide rivet holes therein. Subsequently, the brake lining is preliminarily mounted upon the brake shoe. A vertical drill bit was employed for drilling the lining while the same was mounted upon the shoe, the operation involving the holding of the brake shoe with the lining attached over the drill and subsequently moving the shoe and lining downwardly over the drill point.

In view of the fact that the shoe and lining were held in the hands of the operator and were unsupported and unguided during the drilling operation, the drilling of the lining in alignment with the holes in the shoe was a very difficult task frequently resulting in the breaking of drills and requiring the use of drills of expensive steel. In addition, the countersinks provided in the lining during the drilling operation for the heads of the rivets employed to secure the lining to the shoe, were seldom of the same depth due to the inability of the operator to hold the brake shoe steadily.

In my invention, means is provided for drilling brake lining upon a previously drilled brake shoe wherein a positive alignment guide is provided for the location of the hole to be drilled in one dimension, and visual alignment assisting means are provided for the operator in the other two dimensions, thereby greatly facilitating and speeding up the drilling operation and permitting the use of drills made of a less expensive metal.

The objects and advantages of the invention will be apparent from the accompanying drawings and following detailed description.

In the drawings, Fig. 1 is a side elevational view of apparatus comprising my invention.

Fig. 3 is a top plan view of the device shown in Fig. 1.

Figure 1:
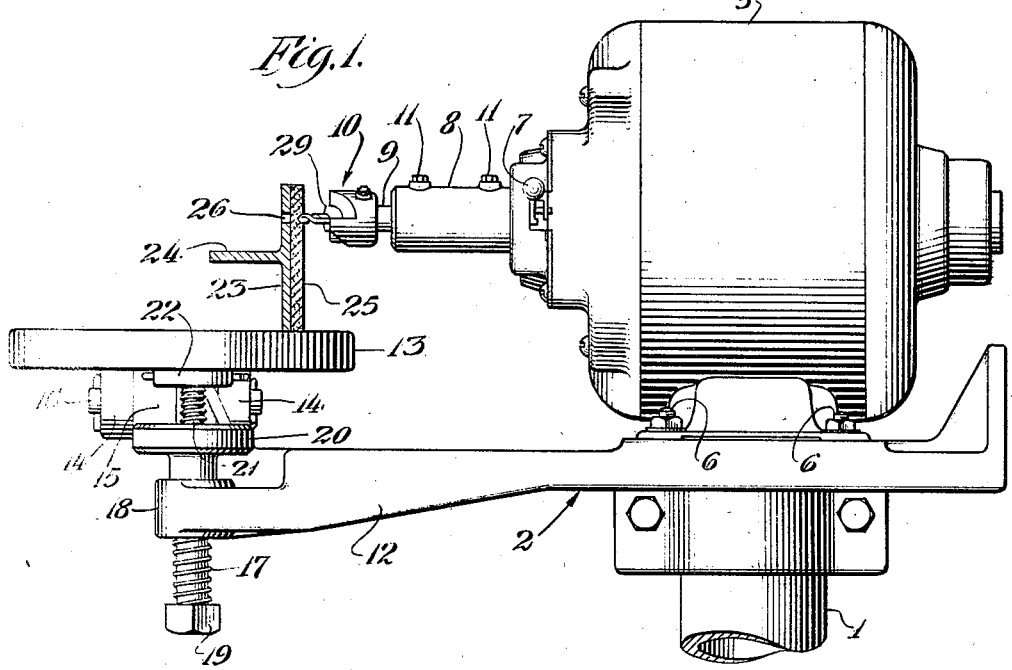
Figure 2:
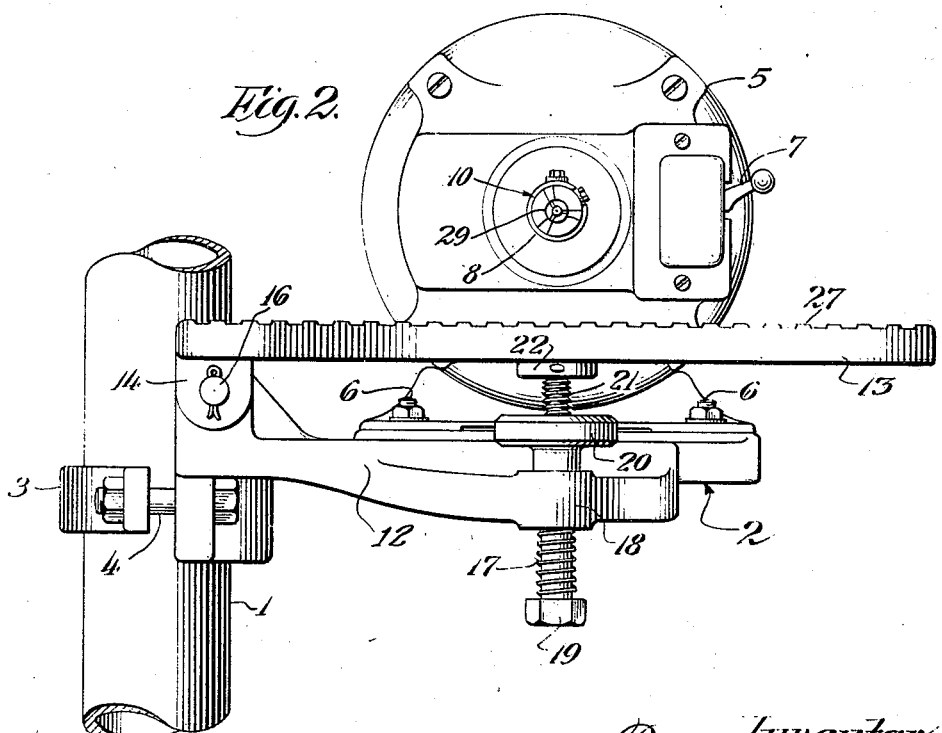
Fig. 2 is an end elevational view of the device shown in Fig. 1.

Referring in detail to the drawings, 1 indicates a supporting post or pillar upon which a platform 2 is mounted. The platform 2 is securely mounted upon the pillar 1 by means of a strap 3 which is attached to a portion of the platform by means of bolts 4 whereby the platform may be raised or lowered or detached from the pillar at will.

An electric motor 5, having suitable electric connections to a source of electricity (not shown), is mounted upon platform 2 and is rigidly secured thereon by means of bolts 6. Operation of the motor 5 is controlled by toggle switch 7. Shaft 8 of the motor is hollow at one end and provides a chuck for the reception of the shank 9 of a drill bit 10, set screws 11 being carried by the shaft to lock the shank 9 in operative position in the hollow chuck.

The platform 2 carries an integral extension 12 upon which a work supporting plate 13 is mounted. The plate 13, at one end carries a pair of spaced lugs 14 which embrace a lug 15 which extends upwardly from the extension 12. A pin 16 is threaded through apertures provided in lugs 14 and 15 whereby plate 13 may be rocked about said pin as a pivotal axis.

A screw 17 having a relatively coarse thread is threaded into a portion 18 of extension 12, said screw, at one end being provided with an hexagonal head 19 whereby the screw may be conveniently turned. The upper or opposite end of the screw 17 carries a disc 20 which is internally threaded to receive a screw 21, having relatively fine threads. A capstan head 22 is rigidly carried at the upper end of the screw 21 and forms a support for the work holding plate 13.

A portion of the usual automotive brake comprises a brake shoe which, in turn, comprises an arcuate flange 23 and a central reinforcing rib 24. In expanding brakes, a brake lining 25 is carried upon the outer face of the arcuate flange and is riveted thereto. In mounting the brake lining 25 upon the brake shoe, it is the usual practice to drill the flange 23 to provide rivet holes 26 therein, prior to the mounting of the lining thereon.

In view of the fact that the brake lining is relatively flexible and is usually stretched when mounted upon the shoe, it is substantially impossible to separately drill both the shoe and the lining to pre-determined dimensions since the respective drilled holes will not register with each other. Of course, if the rivet holes 26 are drilled before the brake lining is mounted on the flange, the rivet holes in the brake lining must be drilled after the lining is mounted on the flange.

In the operation of my invention the arcuate brake shoe, with drilled rivet holes 26 in its flange and with the brake lining 25 fully stretched and preliminarily mounted upon the flange, is positioned on its side upon the work holding plate 13. One of the rivet holes 26 is then approximately lined up in a vertical plane with the point of the bit 10. The screw 17 is then manipulated to raise or lower the plate 13 so as to approximately line up the bit point and the rivet hole 26 in a horizontal plane. By means of screw 21, a fine adjustment of this latter alignment may be made.

After this vertical adjustment of the plate 13 has been made, the vertical distance of the plate from the bit point is rendered a constant and in view of the fact that all of the rivet holes 26 are disposed in lines parallel to the longitudinal axis of the flange 23, this distance remains a constant for the drilling of all the holes in the lining, since the holes above and below the rib 24 are symmetrically arranged.

It then only becomes necessary for the operator to vertically align the bit point and the axis of the hole 26. To assist in this operation, the upper surface of the plate 13 is provided with a plurality of parallel ribs 27, said ribs also being parallel to the axis of the drill bit. These ribs serve as guides to the operator in aligning the center line of the hole 26 with the bit point and also assist the operator in maintaining movement of the shoe in a line parallel to the axis of the bit during the time the lining is being drilled.

As shown best in Fig. 3, the holes bored in the facing 25 are provided with a countersink 28 so that the face of the rivet positioned in each hole is disposed below the working face of the lining. In order to provide the countersink 28, the bit 10 is provided with a reaming portion 29 of adjustable length at the base of the restricted drill, which portion 29 reams out the countersink after the bit has drilled through the lining 25 and entered the bore 26 in the flange.

I claim as my invention:

In a device for drilling automotive brake linings while said linings are in situ upon a previously drilled brake shoe which comprises, a support, a platform mounted upon said support, a work-holding plate for holding said brake shoe pivotally mounted upon said platform whereby said plate may be rocked about said pivot in a vertical plane, a drill bit horizontally positioned over said plate, means for rotating said drill bit, and means spaced from said plate pivot for adjustably supporting said plate at a predetermined position beneath said drill bit to adjust said brake shoe relative to said drill bit, said means comprising a screw having threads of relatively large pitch threadedly mounted in a portion of said platform, said screw being provided with a threaded aperture, a second screw having threads of relatively smaller pitch threaded into said aperture, said plate being supported by said second screw.

FREDERICK C. STANLEY.